(12) United States Patent
Andrews (10) Patent No.: US 11,993,130 B2
(45) Date of Patent: May 28, 2024

(54) COOLING SYSTEMS AND METHODS FOR VEHICLE CABS

(71) Applicants: Tiger Tool International Incorporated, Abbotsford (CA); Michael Andrews, Bellingham, WA (US)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 465 days.

(21) Appl. No.: 17/291,132

(22) PCT Filed: Nov. 5, 2019

(86) PCT No.: PCT/US2019/059930
§ 371 (c)(1),
(2) Date: May 4, 2021

(87) PCT Pub. No.: WO2020/097124
PCT Pub. Date: May 14, 2020

(65) Prior Publication Data
US 2021/0387502 A1 Dec. 16, 2021

Related U.S. Application Data

(60) Provisional application No. 62/755,697, filed on Nov. 5, 2018.

(51) Int. Cl.
*B60H 1/00* (2006.01)

(52) U.S. Cl.
CPC ..... *B60H 1/00464* (2013.01); *B60H 1/00328* (2013.01)

(58) Field of Classification Search
CPC ............ B60H 1/00464; B60H 1/00328; B60H 1/3202
See application file for complete search history.

(56) References Cited

U.S. PATENT DOCUMENTS 2,521,393 A 9/1950 Messinger
2,961,939 A 11/1960 Angelo
(Continued)

FOREIGN PATENT DOCUMENTS

AE 5258 7/2016
AU 201613490 S 7/2016
(Continued)

OTHER PUBLICATIONS apucenter.com, Auxiliary Power Units—Service—Parts, Comfort Master, https://web.archive.org/web/20140111100715/http://apucenter.com/, Jan. 11, 2014, 2 pages.
(Continued)

*Primary Examiner* — Marc E Norman
(74) *Attorney, Agent, or Firm* — Michael R. Schacht; Schacht Law Office, Inc.

(57) ABSTRACT

A vehicle cooling system for a vehicle defining a cab comprises a heat source and an evaporative cooling system. The heat source is supported by the vehicle. The evaporative cooling system is configured to evaporate water using heat from the heat source to form a supply of cool air for cooling the cab.

12 Claims, 5 Drawing Sheets

(56) References Cited

U.S. PATENT DOCUMENTS

| | | | |
|---|---|---|---|
| 3,065,381 A | 11/1962 | Kyle | |
| 3,290,576 A | 12/1966 | Jensen et al. | |
| 3,583,156 A | 6/1971 | Schabert | |
| 3,606,982 A * | 9/1971 | Anderson | B60P 3/36 |
| | | | 261/DIG. 4 |
| 3,663,364 A | 5/1972 | Thompson et al. | |
| 3,897,526 A * | 7/1975 | Morse | F24F 5/0035 |
| | | | 261/DIG. 4 |
| 3,906,906 A | 9/1975 | Arai | |
| D240,428 S | 7/1976 | Hoffman | |
| 4,055,299 A | 10/1977 | Norberg et al. | |
| 4,217,764 A | 8/1980 | Armbruster | |
| 4,280,330 A | 7/1981 | Harris et al. | |
| 4,463,576 A | 8/1984 | Burnett et al. | |
| 4,531,379 A | 7/1985 | Diefenthaler, Jr. | |
| 4,602,485 A | 7/1986 | Fujimoto et al. | |
| D287,264 S | 12/1986 | Rinaldo et al. | |
| 4,630,775 A | 12/1986 | Mandon et al. | |
| 4,648,356 A | 3/1987 | Hayashi | |
| 4,825,663 A | 5/1989 | Nijar et al. | |
| 4,925,092 A | 5/1990 | Yoshida et al. | |
| 4,947,657 A | 8/1990 | Kalmbach | |
| D322,122 S | 12/1991 | Guetersloh et al. | |
| D324,420 S | 3/1992 | Farce | |
| D338,952 S | 8/1993 | Snow | |
| 5,285,654 A * | 2/1994 | Ferdows | B60H 1/3202 |
| | | | 62/304 |
| 5,333,678 A | 8/1994 | Mellum et al. | |
| 5,408,150 A | 4/1995 | Wilcox | |
| 5,481,178 A | 1/1996 | Wilcox et al. | |
| 5,701,755 A | 12/1997 | Severson et al. | |
| 5,705,919 A | 1/1998 | Wilcox | |
| D393,703 S | 4/1998 | Gilbertson | |
| 5,808,441 A | 9/1998 | Nehring | |
| 5,896,750 A | 4/1999 | Karl | |
| 5,901,780 A | 5/1999 | Zeigler et al. | |
| 5,929,620 A | 7/1999 | Dobkin et al. | |
| 6,116,513 A | 9/2000 | Perhats | |
| 6,144,194 A | 11/2000 | Varga | |
| 6,158,230 A | 12/2000 | Katsuki | |
| 6,177,787 B1 | 1/2001 | Hobrecht | |
| D453,560 S | 2/2002 | Van Brunt | |
| 6,367,272 B1 | 4/2002 | Zeng et al. | |
| D456,887 S | 5/2002 | Zlotnik | |
| 6,427,465 B1 | 8/2002 | Bednarchik et al. | |
| 6,460,356 B1 | 10/2002 | Tao et al. | |
| 6,546,744 B1 * | 4/2003 | Cavender | B60H 1/00364 |
| | | | 62/171 |
| 6,615,602 B2 | 9/2003 | Wilkinson | |
| 6,651,759 B1 | 11/2003 | Gruenwald et al. | |
| 6,801,842 B2 | 10/2004 | Egami et al. | |
| 6,863,139 B2 | 3/2005 | Egami et al. | |
| 7,047,743 B1 | 5/2006 | Stahlhut et al. | |
| D532,893 S | 11/2006 | Wu | |
| D536,078 S | 1/2007 | Leon | |
| D536,079 S | 1/2007 | Leon | |
| 7,181,918 B2 | 2/2007 | Reinders | |
| D548,750 S | 8/2007 | Neeley et al. | |
| 7,305,842 B1 | 12/2007 | Schiff | |
| D575,381 S | 8/2008 | Leon | |
| 7,430,874 B2 | 10/2008 | Prince et al. | |
| 7,448,227 B2 | 11/2008 | Zeigler et al. | |
| 7,579,801 B2 | 8/2009 | Mazaika | |
| 7,762,062 B2 | 7/2010 | Opris | |
| D630,310 S | 1/2011 | Beland et al. | |
| D631,145 S | 1/2011 | Beland et al. | |
| D644,320 S | 8/2011 | Virr et al. | |
| D647,192 S | 10/2011 | Esteve et al. | |
| D648,018 S | 11/2011 | Sordo | |
| D663,816 S | 7/2012 | Tebe Poves et al. | |
| 8,468,843 B2 | 6/2013 | Futernik et al. | |
| 8,579,748 B2 | 11/2013 | Kawasaki et al. | |
| D698,431 S | 1/2014 | Garbusi et al. | |
| 8,927,905 B1 | 1/2015 | Sunday | |
| D723,674 S | 3/2015 | Zaari | |
| 8,967,116 B2 | 3/2015 | Leone et al. | |
| 9,049,971 B2 | 6/2015 | Andrews | |
| 9,050,897 B1 | 6/2015 | Collins | |
| 9,102,225 B2 | 8/2015 | Major et al. | |
| 9,291,191 B1 | 3/2016 | Rejkowski et al. | |
| D755,943 S | 5/2016 | Lanssky | |
| 9,374,003 B1 | 6/2016 | McJimsey et al. | |
| 9,375,121 B2 | 6/2016 | Coesel | |
| D762,830 S | 8/2016 | Lewis | |
| D763,423 S | 8/2016 | Hewett et al. | |
| D766,414 S | 9/2016 | Chu | |
| D778,415 S | 2/2017 | Ogg | |
| 9,669,936 B1 | 6/2017 | Fiterman et al. | |
| 9,701,175 B2 | 7/2017 | Miller et al. | |
| D801,500 S | 10/2017 | Andrews | |
| D801,501 S | 10/2017 | Andrews | |
| 9,925,847 B2 | 3/2018 | Andrews et al. | |
| 10,309,703 B2 | 6/2019 | Andrews | |
| 10,384,785 B2 | 8/2019 | Bruno et al. | |
| 10,391,837 B2 | 8/2019 | Andrews et al. | |
| 10,407,048 B1 | 9/2019 | Sheldon et al. | |
| 10,543,925 B2 | 1/2020 | Bammann et al. | |
| 10,843,804 B2 | 11/2020 | Lo | |
| 10,926,884 B2 | 2/2021 | Bruno et al. | |
| 11,135,892 B2 | 10/2021 | Andrews | |
| 11,136,050 B2 | 10/2021 | Frankenberger et al. | |
| 11,407,283 B2 | 8/2022 | Andrews | |
| 2002/0070557 A1 | 6/2002 | Geis | |
| 2002/0112490 A1 | 8/2002 | Gong | |
| 2002/0145209 A1 * | 10/2002 | Litz | B60H 1/3202 |
| | | | 261/106 |
| 2002/0157414 A1 | 10/2002 | Iwanami et al. | |
| 2002/0189265 A1 | 12/2002 | Ferris et al. | |
| 2003/0098148 A1 | 5/2003 | Mehraban et al. | |
| 2003/0192952 A1 | 10/2003 | Horn et al. | |
| 2003/0217559 A1 | 11/2003 | Ieda et al. | |
| 2004/0025525 A1 | 2/2004 | Kubo et al. | |
| 2004/0104578 A1 | 6/2004 | Wurtele | |
| 2004/0168455 A1 | 9/2004 | Nakamura | |
| 2005/0035657 A1 | 2/2005 | Brummett et al. | |
| 2005/0044864 A1 | 3/2005 | Manole et al. | |
| 2005/0053495 A1 | 3/2005 | Lebecq et al. | |
| 2005/0166629 A1 | 8/2005 | Axe et al. | |
| 2005/0193754 A1 | 9/2005 | Chang et al. | |
| 2005/0217288 A1 | 10/2005 | Uno et al. | |
| 2005/0241818 A1 | 11/2005 | Yakumaru et al. | |
| 2005/0257545 A1 | 11/2005 | Ziehr et al. | |
| 2006/0028871 A1 | 2/2006 | Suzuki | |
| 2006/0042286 A1 | 3/2006 | Heberle et al. | |
| 2006/0130469 A1 | 6/2006 | Baeuerle et al. | |
| 2006/0156761 A1 | 7/2006 | Mola et al. | |
| 2006/0288713 A1 | 12/2006 | Knight et al. | |
| 2007/0075695 A1 | 4/2007 | Gan et al. | |
| 2007/0193291 A1 | 8/2007 | Reddin et al. | |
| 2007/0204639 A1 | 9/2007 | Harrison | |
| 2007/0289325 A1 | 12/2007 | Stone | |
| 2009/0014150 A1 | 1/2009 | Masters et al. | |
| 2009/0136387 A1 | 5/2009 | Picton et al. | |
| 2009/0211280 A1 | 8/2009 | Alston | |
| 2009/0228150 A1 | 9/2009 | Alston | |
| 2009/0293522 A1 | 12/2009 | Miyazaki | |
| 2010/0089563 A1 | 4/2010 | Sundhar et al. | |
| 2010/0146968 A1 | 6/2010 | Simpson et al. | |
| 2010/0181138 A1 | 7/2010 | Khadiya et al. | |
| 2010/0192548 A1 | 8/2010 | Irlbeck et al. | |
| 2011/0067422 A1 | 3/2011 | Ichishi et al. | |
| 2011/0114405 A1 | 5/2011 | Perhats | |
| 2011/0209490 A1 | 9/2011 | Mijanovic et al. | |
| 2011/0296833 A1 | 12/2011 | Jozsa et al. | |
| 2011/0302942 A1 | 12/2011 | Birchard | |
| 2012/0031581 A1 | 2/2012 | Chillar et al. | |
| 2013/0000342 A1 | 1/2013 | Blasko et al. | |
| 2013/0056992 A1 | 3/2013 | Wada et al. | |
| 2013/0118196 A1 | 5/2013 | Chen et al. | |
| 2013/0199217 A1 | 8/2013 | Arai et al. | |
| 2013/0227973 A1 | 9/2013 | Kang et al. | |
| 2013/0263574 A1 | 10/2013 | Levin et al. | |
| 2013/0270249 A1 * | 10/2013 | Suzuki | H01M 10/625 |
| | | | 219/202 |

(56) References Cited

U.S. PATENT DOCUMENTS

| | | |
|---|---|---|
| 2013/0284524 A1 | 10/2013 | Collins |
| 2013/0319359 A1 | 12/2013 | Evans |
| 2014/0007574 A1 | 1/2014 | Pegg et al. |
| 2014/0007605 A1 | 1/2014 | Schneider et al. |
| 2014/0230470 A1 | 8/2014 | Cook |
| 2014/0244107 A1 | 8/2014 | Delevski et al. |
| 2014/0259517 A1 | 9/2014 | Andrews |
| 2014/0260369 A1* | 9/2014 | LePoudre ............ F28D 15/00 62/314 |
| 2014/0270240 A1 | 9/2014 | Solomon et al. |
| 2014/0270242 A1 | 9/2014 | Cheung et al. |
| 2014/0345104 A1 | 11/2014 | Andrews et al. |
| 2015/0000636 A1 | 1/2015 | Stockbridge et al. |
| 2015/0013357 A1 | 1/2015 | Stockbridge et al. |
| 2015/0047144 A1 | 2/2015 | Coesel |
| 2015/0096313 A1 | 4/2015 | Ragazzi |
| 2015/0209918 A1 | 7/2015 | Andrews |
| 2015/0210141 A1 | 7/2015 | Ragazzi |
| 2015/0224635 A1 | 8/2015 | Andrews |
| 2015/0251520 A1 | 9/2015 | Andrews et al. |
| 2015/0289734 A1 | 10/2015 | Andrews |
| 2015/0314669 A1 | 11/2015 | Noda |
| 2016/0089958 A1 | 3/2016 | Powell |
| 2016/0111959 A1 | 4/2016 | Erickson, Jr. et al. |
| 2016/0121899 A1 | 5/2016 | Wankhede |
| 2016/0197534 A1 | 7/2016 | Walker et al. |
| 2016/0238292 A1 | 8/2016 | Andrews |
| 2016/0265819 A1 | 9/2016 | Durrani et al. |
| 2016/0288619 A1 | 10/2016 | Andrews |
| 2016/0327289 A1* | 11/2016 | Mothfar ............ B60H 1/00264 |
| 2016/0368373 A1 | 12/2016 | Dudar et al. |
| 2017/0015175 A1 | 1/2017 | Pursifull |
| 2017/0015176 A1 | 1/2017 | Ulrey et al. |
| 2017/0043647 A1* | 2/2017 | Vergamini ............ B60H 3/022 |
| 2017/0070065 A1 | 3/2017 | Weflen |
| 2017/0129614 A1 | 5/2017 | Bammann et al. |
| 2017/0158026 A1 | 6/2017 | Menard et al. |
| 2017/0197492 A1 | 7/2017 | Ishizeki et al. |
| 2017/0197678 A1 | 7/2017 | Scaringe |
| 2017/0217286 A1 | 8/2017 | Tsukamoto et al. |
| 2017/0229965 A1 | 8/2017 | Parto |
| 2017/0305236 A1 | 10/2017 | Berkson et al. |
| 2017/0341759 A1 | 11/2017 | Bruno et al. |
| 2018/0058287 A1 | 3/2018 | Zhang |
| 2018/0162377 A1 | 6/2018 | Colavincenzo et al. |
| 2018/0215235 A1 | 8/2018 | Andrews et al. |
| 2018/0215475 A1 | 8/2018 | Hurt et al. |
| 2018/0237144 A1 | 8/2018 | Bruno et al. |
| 2018/0266742 A1 | 9/2018 | Andrews |
| 2019/0077216 A1 | 3/2019 | Andrews |
| 2019/0162121 A1 | 5/2019 | Staubach et al. |
| 2019/0193524 A1 | 6/2019 | Stoltz |
| 2019/0255912 A1 | 8/2019 | Ulrey et al. |
| 2019/0255913 A1 | 8/2019 | Ulrey et al. |
| 2019/0256077 A1 | 8/2019 | Stoltz |
| 2019/0283897 A1 | 9/2019 | Orlando et al. |
| 2019/0337627 A1 | 11/2019 | Bruno et al. |
| 2020/0235666 A1 | 10/2020 | Ke et al. |
| 2021/0159792 A1 | 5/2021 | Andrews et al. |
| 2022/0048355 A1 | 2/2022 | Andrews |
| 2022/0281286 A1 | 9/2022 | Andrews |
| 2022/0281288 A1 | 9/2022 | Andrews |
| 2023/0163688 A1 | 5/2023 | Andrews et al. |

FOREIGN PATENT DOCUMENTS

| | | |
|---|---|---|
| AU | 2017212417 A1 | 5/2018 |
| AU | 2015229661 B2 | 5/2019 |
| AU | 2016243053 A1 | 5/2021 |
| AU | 2016243053 B2 | 5/2021 |
| AU | 2017261902 A1 | 4/2022 |
| AU | 2017261902 B2 | 4/2022 |
| CA | 2978335 A1 | 10/2016 |
| CA | 3004780 A1 | 8/2017 |
| CA | 3015917 A1 | 11/2017 |
| CA | 2939298 C | 4/2019 |
| CA | 3103426 A1 | 12/2019 |
| CN | 202926544 U | 5/2013 |
| CN | 103303098 A | 9/2013 |
| CN | 103363603 A | 10/2013 |
| CN | 203623404 U | 6/2014 |
| CN | 104713260 A | 6/2015 |
| CN | 104919259 A | 9/2015 |
| CN | ZL2016302998987 | 7/2016 |
| CN | 106414122 A | 2/2017 |
| CN | 109383222 A | 2/2019 |
| DE | 102009048719 A1 | 4/2011 |
| DE | 102019105576 A1 | 9/2019 |
| EP | 1219478 B1 | 3/2006 |
| EP | 2100494 A2 | 9/2009 |
| EP | 0032556780001 | 6/2016 |
| EP | 3277529 A1 | 2/2018 |
| EP | 2897270 B1 | 7/2018 |
| EP | 3277529 A4 | 12/2018 |
| EP | 3408117 A4 | 9/2019 |
| EP | 3455095 B1 | 11/2021 |
| EP | 4066368 A1 | 10/2022 |
| EP | 3277529 B1 | 10/2023 |
| FR | 2995014 B1 | 9/2014 |
| FR | 3040563 B1 | 11/2019 |
| JP | 2621547 B | 6/1997 |
| JP | H11301255 A | 11/1999 |
| JP | 2005212735 A | 8/2005 |
| JP | 2006298283 A | 11/2006 |
| JP | 2008081078 A | 4/2008 |
| JP | 2009184621 A | 8/2009 |
| JP | 2013217340 A | 10/2013 |
| JP | 2018077003 A | 5/2018 |
| JP | 2020015414 A | 1/2020 |
| JP | 2020026197 A | 2/2020 |
| KR | 20080010646 A | 1/2008 |
| RU | 2146034 C1 | 2/2000 |
| RU | 2157037 C1 | 9/2000 |
| RU | 2425436 C2 | 7/2011 |
| RU | 2516912 C1 | 5/2014 |
| RU | 2571895 C1 | 12/2015 |
| SA | 5473 | 7/2016 |
| SA | 516371813 | 9/2016 |
| SA | 518392046 B1 | 6/2023 |
| SU | 634976 A1 | 11/1978 |
| SU | 1558311 A3 | 4/1990 |
| WO | 2007111905 A2 | 10/2007 |
| WO | 2011094099 A1 | 8/2011 |
| WO | 2013142992 A1 | 10/2013 |
| WO | 2014149567 A1 | 9/2014 |
| WO | 2015065643 A1 | 5/2015 |
| WO | 2015097457 A1 | 7/2015 |
| WO | 2015138352 A1 | 9/2015 |
| WO | 2016006278 A1 | 1/2016 |
| WO | 2016161447 A1 | 10/2016 |
| WO | 2017132260 A1 | 8/2017 |
| WO | 2017197407 A1 | 11/2017 |
| WO | 2018009406 A1 | 1/2018 |
| WO | 2019075269 A1 | 4/2019 |
| WO | 2020097124 A1 | 5/2020 |

OTHER PUBLICATIONS

Bergstrom, Bergstrom NITE No-Idle, https://web.archive.org/web/20140207093405/http://us.bergstrominc.com/nite-no-idle/, Feb. 7, 2014, 1 page.

CIPO, "Notification of the First Office Action", Application No. 201580012907.2, dated Apr. 27, 2018, 8 pages.

ClimaCab Crosspoint Solutions, ClimaCab 3.0 APU, Product Overview and Brochure, http://www.crosspointsolutionsgroup.com/climacab/product/climacab-apu.html, 2012, 6 pages.

Cool-It, 12V No-Idle Split A/C System, Product Overview and Brochure, http://cool-it.ca/?s=12+volt+no+idle+system, 2012, 8 pages.

DC Airco, High Efficiency Direct Current Air Conditioners, https://web.archive.org/web/20130825041413/http://dcairco.com/index.php/products/trucks, Aug. 25, 2013, 3 pages.

(56) References Cited

OTHER PUBLICATIONS

Dometic Group, Dometic Showcases Expanded Line of HVAC Systems for Day Cabs, http://www.2.dometic.com/enus/Americas/USA/Truck-News/Dometic-Showcases-Expanded-Line-of-HVAC-Systems-For-Day-Cabs/, 2010, 1 page.
Hammond Air Conditioning Ltd., Arctic Breeze Truck AC: 12V/DC air conditioning keeps cabs cool without wasting fuel, https://web.archive.org/web/20140108111758/http://www.arcticbreeze-truckac.com/, Jan. 8, 2014, 1 page.
Idle Free Systems, Inc., Systems for all driving conditions, budgets, and investment timelines, http://idlefreesystems.com/no-idle-elimination-systems-battery-reffer-busses.html, 2010-2011, 1 page.
Indel B, Sleeping Well, https://web.archive.org/web/20130530064452/http://www.indelb.com/products/truck_air_conditioning/sleeping_well, May 30, 2013, 2 pages.
International Search Authority, ISR, PCT/US2021039834, dated Oct. 14, 2021, 2 pages.
International Searching Authority, ISR & Written Opinion, PCT/US/2020062395, dated Feb. 25, 2021, 44 pages.
International Searching Authority, ISR & Written Opinion, PCT/US2015019523, dated Jun. 10, 2015, 7 pages.
International Searching Authority, ISR & Written Opinion, PCT/US2016/025923, dated Sep. 8, 2016, 7 pages.
International Searching Authority, ISR & Written Opinion, PCT/US2017/032750, dated Aug. 24, 2017, 7 pages.
International Searching Authority, ISR & Written Opinion, PCT/US2018/055510. dated Dec. 27, 2018, 9 pages.
International Searching Authority, ISR & Written Opinion, PCT/US2019/035444, dated Aug. 29, 2019, 8 pages.
International Searching Authority, Written Opinion & ISR, PCT/US2017/014941, dated Apr. 20, 2017, 7 pages.
Rigmaster Power, The Ultimate Stand-Alone Truck Mounted APU, http://rigmasterpower.com, 2011, 1 page.
Smith, Sam, "Jaguar Builds A Twin-Turbine Electric Supercar You Can't Have", Gear, https://www.wired.com/2010/09/paris-auto-show-jaguar-cx75/#:~:text=At%20this%20year's%20Paris%20auto,ever%20be%20able%20to%20buy, Sep. 30, 2010, 1 page.
Thermo King, APU Tripac Evolution, Product Overview and Brochure, http://www.na.thermoking.com/tk-innovation/global/en/products/apu.html, 2011, 9 pages.
US Department of Energy, Combined Heat and Power Technology Fact Sheet Series, "Absorption Chillers for CHP Systems", DOE/EE-1608, May 2017, 4 pages.
USPTO, "Final Office Action, U.S. Appl. No. 15/047,442,", dated Feb. 14, 2018, 15 pages.
USPTO, "Final Office Action, U.S. Appl. No. 15/090,455,", dated Aug. 30, 2018, 18 pages.
USPTO, "Final Office Action, U.S. Appl. No. 15/090,455,", dated Dec. 22, 2021, 44 pages.
USPTO, "Non-Final Office Action, U.S. Appl. No. 15/047,442,", dated Aug. 10, 2017, 6 pages.
USPTO, "Non-Final Office Action, U.S. Appl. No. 14/642,601,", dated Jun. 16, 2017, 9 pages.
USPTO, "Non-Final Office Action, U.S. Appl. No. 15/090,455,", dated Jan. 18, 2018, 29 pages.
USPTO, "Non-Final Office Action, U.S. Appl. No. 15/090,455,", dated Mar. 19, 2019, 17 pages.
USPTO, "Non-Final Office Action, U.S. Appl. No. 15/936,747,", dated Sep. 13, 2018, 13 pages.
Linear Technology LTC3787, PolyPhase Synchronous Boost Controller, https://www.analog.com/media/en/technical-documentation/data-sheets/3787fc.pdf; Year 2019, 36 pages.

* cited by examiner

COOLING SYSTEMS AND METHODS FOR VEHICLE CABS

RELATED APPLICATIONS

This application, U.S. application Ser. No. 17/291,132 filed May 4, 2021, is a 371 of International PCT Application No. PCT/US2019/059930 filed on Nov. 5, 2019.

International PCT Application No. PCT/US2019/059930 claims benefit of U.S. Provisional Application Ser. No. 62/755,697 filed Nov. 5, 2018, the contents of which are incorporated herein by reference.

TECHNICAL FIELD

The present invention relates to systems and methods for cooling the interior of a vehicle and, more particularly, to vehicle cooling systems and methods that employ a waste heat from a heat source on the vehicle.

BACKGROUND

Utility power is typically made available as an AC power signal distributed from one or more centralized sources to end users over a power distribution network. However, utility power is unavailable for certain structures. For example, movable structures such vehicles do not have access to utility power when moving and can be connected to power distribution network when parked only with difficulty. Similarly, remote structures such as cabins and military installations not near the utility power distribution network often cannot be practically powered using utility power. The term "vehicle" as used herein also refers to non-powered structures such as cabins and shipping containers.

Vehicle cooling systems have substantial energy requirements and represent a major energy draw. Vehicles such as trucks or boats often rely on the availability of the primary mover engine when heating or cooling is required, but use of the primary mover engine for cooling is inefficient, especially when the vehicle is not moving.

The need thus exists for improved cooling systems that optimize the use of energy consumed by vehicles and especially stationary vehicles.

SUMMARY

The present invention may be embodied as a vehicle cooling system for a vehicle defining a cab. The vehicle cooling system comprises a heat source and an evaporative cooling system. The heat source is supported by the vehicle. The evaporative cooling system is configured to evaporate water using heat from the heat source to form a supply of cool air for cooling the cab.

The present invention may also be embodied as a vehicle cooling system for a vehicle defining a cab comprising a generator and an evaporative cooling system. The generator is supported by the vehicle. The evaporative cooling system is configured to evaporate water using heat from the generator to form a supply of cool air for cooling the cab.

The present invention may also be embodied as a method of cooling a cab of a vehicle comprising the following steps. A heat source is supported on the vehicle. Supply of cool air for cooling the cab is formed by evaporating water using heat from the heat source.

DETAILED DESCRIPTION

The present invention may be embodied in a number of different example configurations, and several examples of vehicle cooling systems constructed in accordance with, and embodying, the principles of the present invention will be described separately below.

I. First Example Heating and Cooling System

Figure 1:
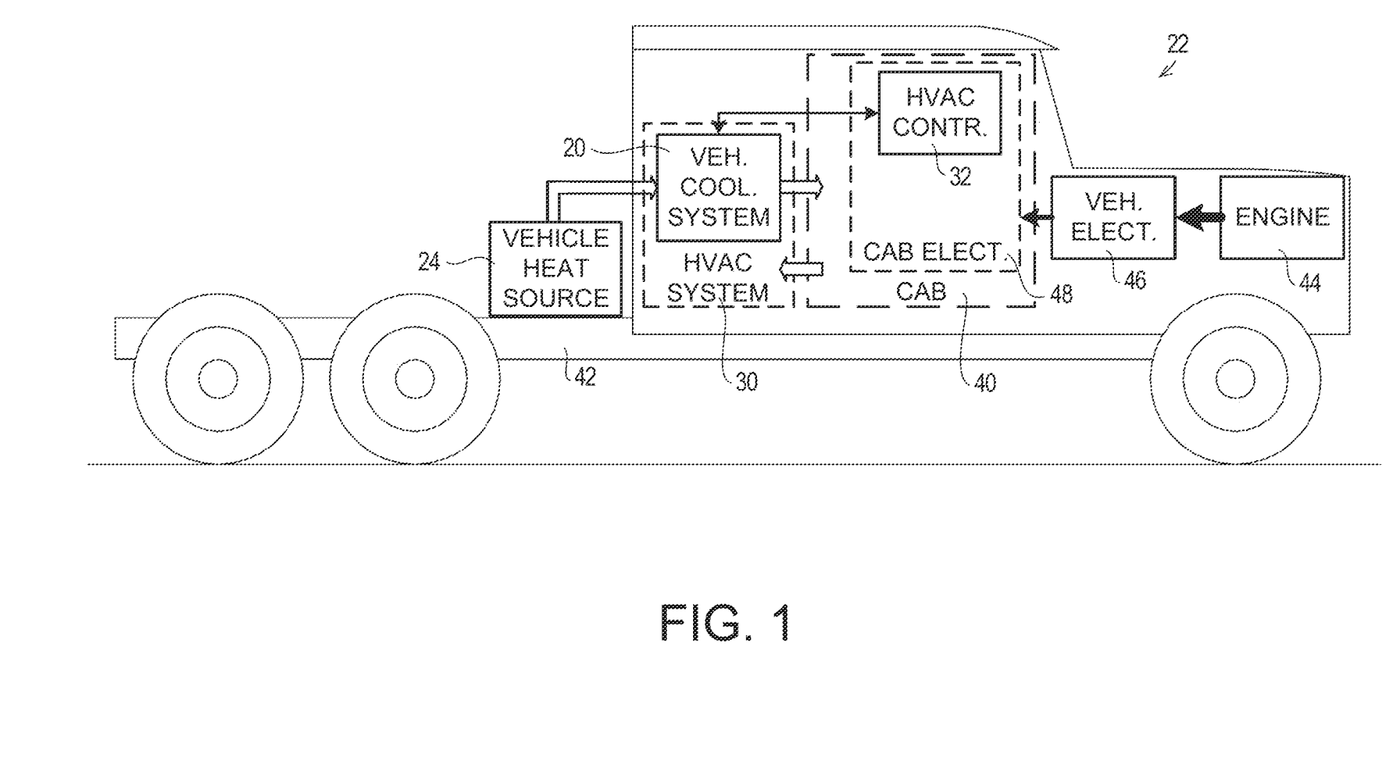
FIG. 1 is a highly schematic side elevation view of vehicle employing a first example vehicle cooling system of the present invention.

Referring initially to FIG. 1 of the drawing, depicted therein is a first example vehicle cooling system 20 of the present invention. The first example vehicle cooling system 20 is mounted on a vehicle 22 defining a vehicle heat source 24. The term "vehicle" will be used herein to refer to a structure when that structure is not connected to utility power. Examples of vehicles include trucks, automobiles, shipping containers, boats, and cabins. The present is of particular significance when applied to vehicles such as trucks and boats but may also have application to any structure, whether fixed or movable, that does not have access to utility power at least a portion of the time.

The first example vehicle cooling system 20 is an evaporative cooling system that cools air through the evaporation of water. Because the evaporation of water requires absorption of a relatively large amount of heat, the temperature of dry air can be lowered significantly during the phase transition of water from liquid water (liquid phase) to water vapor (vapor phase) during the evaporative cooling process. The first example vehicle cooling system 20 uses heated, dry air from the vehicle heat source 24 when operating in a cooling mode to form a source of cooled air.

The example vehicle cooling system 20 may be configured to form a part of a heating, ventilating, and air conditioning (HVAC) system 30 that is also capable of operating in a heating mode. The HVAC system 30 further comprises an HVAC control system 32 that determines whether the HVAC system 30 operates in the cooling mode or in the heating mode. The HVAC control system 32 may be a simple ON/OFF switch operated by an operator of the vehicle 22 to turn the first example vehicle cooling system 20 on or off as desired. Alternatively, the HVAC control system 32 may automatically operate the first example cooling system 20 to maintain a desired temperature. When the HVAC system 30 is further capable of operating in a heating and/or ventilating mode, the HVAC control system 32 may automatically operate the HVAC system 30 to operate in any of the cooling, heating, and/or ventilating modes as necessary for the comfort of the operator.

The example vehicle 22 is a truck defining frame 42 that supports a cab 40. The example heat source 24 is mounted on the frame 42' outside of the cab 40 as shown in FIG. 1. When the HVAC system 30 operates in the cooling mode, the vehicle cooling system 20 is controlled to supply cooled air to the interior of the cab 40 of the vehicle 22. When the HVAC system 30 operates in the optional heating mode, the HVAC system 30 supplies heated air to the interior of the cab 40 of the vehicle 22.

The example vehicle 22 further comprises an engine 44 that is supported on the frame 42. The example vehicle 22 further defines a vehicle electrical system 46 that supplies electrical power to a cab electronics system 48. Conventionally, the vehicle electrical system 46 generates electricity through one or more sources such as an alternator (not shown) driven by the engine 44, a battery (not shown), and/or ancillary power supplies such as a generator supported by the vehicle 22. The example heat source 24 may take the form of an ancillary generator for generating electrical power for use by the vehicle electrical system 46. Alternatively, the heat source 24 may take the form of an existing heat source on the vehicle 22 such as the engine 44 of the vehicle 22.

II. Second Example Heating and Cooling System

Figure 2:
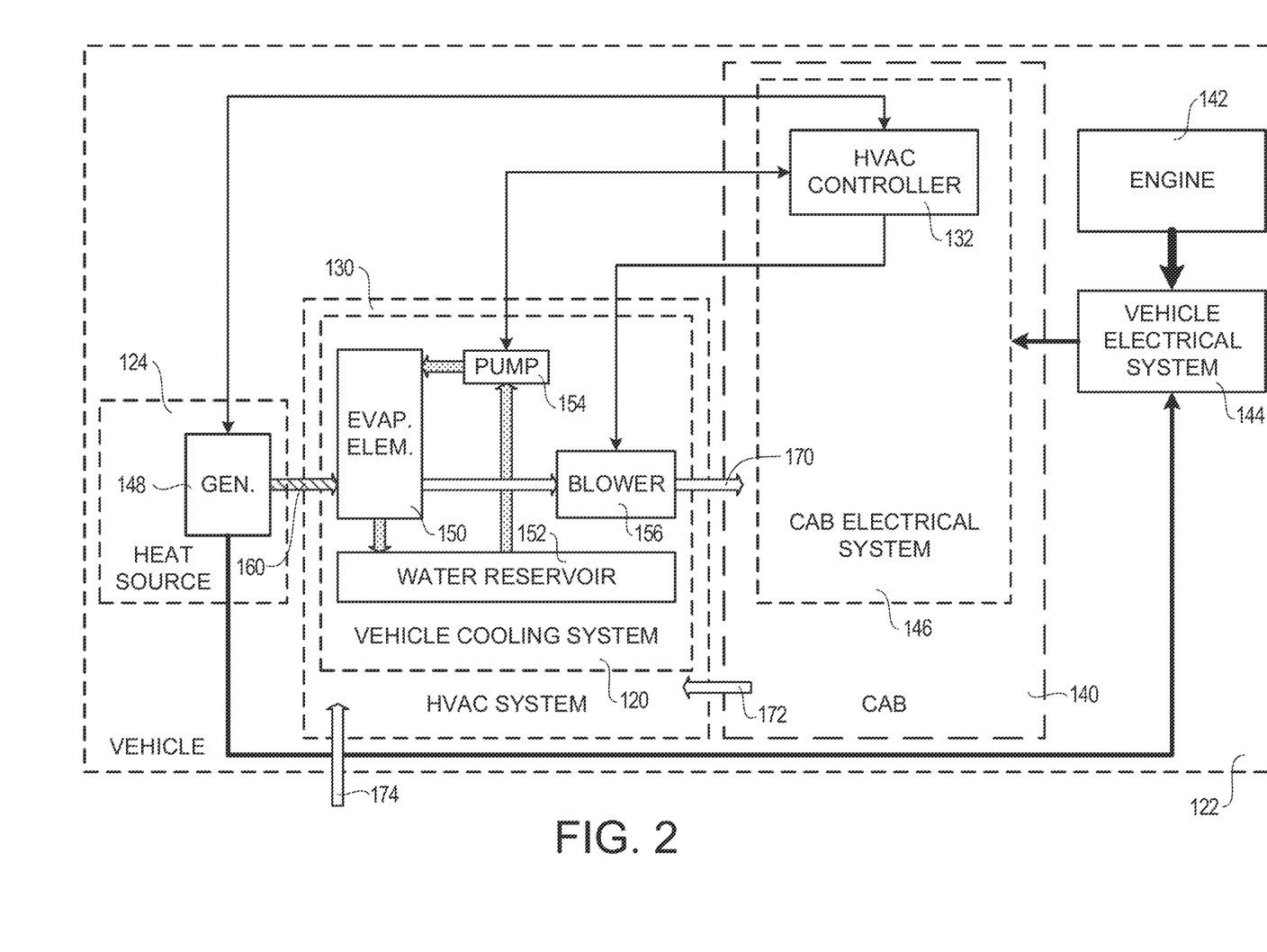
FIG. 2 is a block diagram of a vehicle employing a second example vehicle cooling system of the present invention.

Referring now to FIG. 2 of the drawing, depicted therein is a second example vehicle cooling system 120 of the present invention. The second example vehicle cooling system 120 is mounted on a vehicle 122 defining a vehicle heat source 124.

The second example vehicle cooling system 120 is an evaporative cooling system that cools air through the evaporation of water. Because the evaporation of water requires absorption of a relatively large amount of heat, the temperature of dry air can be lowered significantly during the phase transition of water from liquid water (liquid phase) to water vapor (vapor phase) during the evaporative cooling process. The first example vehicle cooling system 120 uses heated, dry air from the vehicle heat source 124 when operating in a cooling mode to form a source of cooled air.

The example vehicle cooling system 120 may be configured to form a part of a heating, ventilating, and air conditioning (HVAC) system 130 that is also capable of operating in a heating mode. The HVAC system 130 further comprises an HVAC control system 132 that determines whether the HVAC system 130 operates in the cooling mode or in the heating mode. The HVAC control system 132 may be a simple ON/OFF switch operated by an operator of the vehicle 122 to turn the first example vehicle cooling system 120 on or off as desired. Alternatively, the HVAC control system 132 may automatically operate the first example cooling system 120 to maintain a desired temperature. When the HVAC system 130 is further capable of operating in a heating and/or ventilating mode, the HVAC control system 132 may automatically operate the HVAC system 130 to operate in any of the cooling, heating, and/or ventilating modes as necessary for the comfort of the operator.

The example vehicle 122 will typically take the form a truck defining frame (not shown in FIG. 2) that supports a cab 140. The example heat source 124 is typically mounted on the frame outside of the cab 140. When the HVAC system 130 operates in the cooling mode, the vehicle cooling system 120 is controlled to supply cooled air to the interior of the cab 140 of the vehicle 122. When the HVAC system 130 operates in the optional heating mode, the HVAC system 130 supplies heated air to the interior of the cab 140 of the vehicle 122.

The example vehicle 122 further comprises an engine 142 and a vehicle electrical system 144 that supplies electrical power to a cab electronics system 146. Conventionally, the vehicle electrical system 144 generates electricity through one or more sources such as an alternator (not shown) driven by the engine 142, a battery (not shown), and/or ancillary power supplies such as a generator 148 for generating electrical power for use by the vehicle electrical system 144. The generator 148 forms the example heat source 124 as shown in FIG. 2.

FIG. 2 illustrates that the second example vehicle cooling system 120 comprises an evaporator element 150, a water reservoir 152, a pump 154, and a blower 156. The evaporator element 150 typically takes the form of a pad or other material that exposes air 160 from the generator 148 to water from the water reservoir 152. The pump 154 pumps water from the water reservoir 152 and onto the evaporator element 150. Water on the evaporator element 150 that is not evaporated by the heated air 160 collects back in the water reservoir 152 for reuse. The example HVAC system 130 further comprises supply and return air ducts 170 and 172 and an outside air inlet duct 174.

The air 160 from the generator 148 is hot and dry. After the air 160 passes over the evaporator element 150, the air is cooled by the evaporation process. The blower 156 forces the cooled air into the cab 140.

FIG. 2 further illustrates that the HVAC controller 132 may be operatively connected to one or more of the generator 148, the pump 154, and the blower 156 to control operation of the second example vehicle cooling system 120 based on one or more settings determined by the operator of the vehicle 122.

III. Third Example Heating and Cooling System

Figure 3:
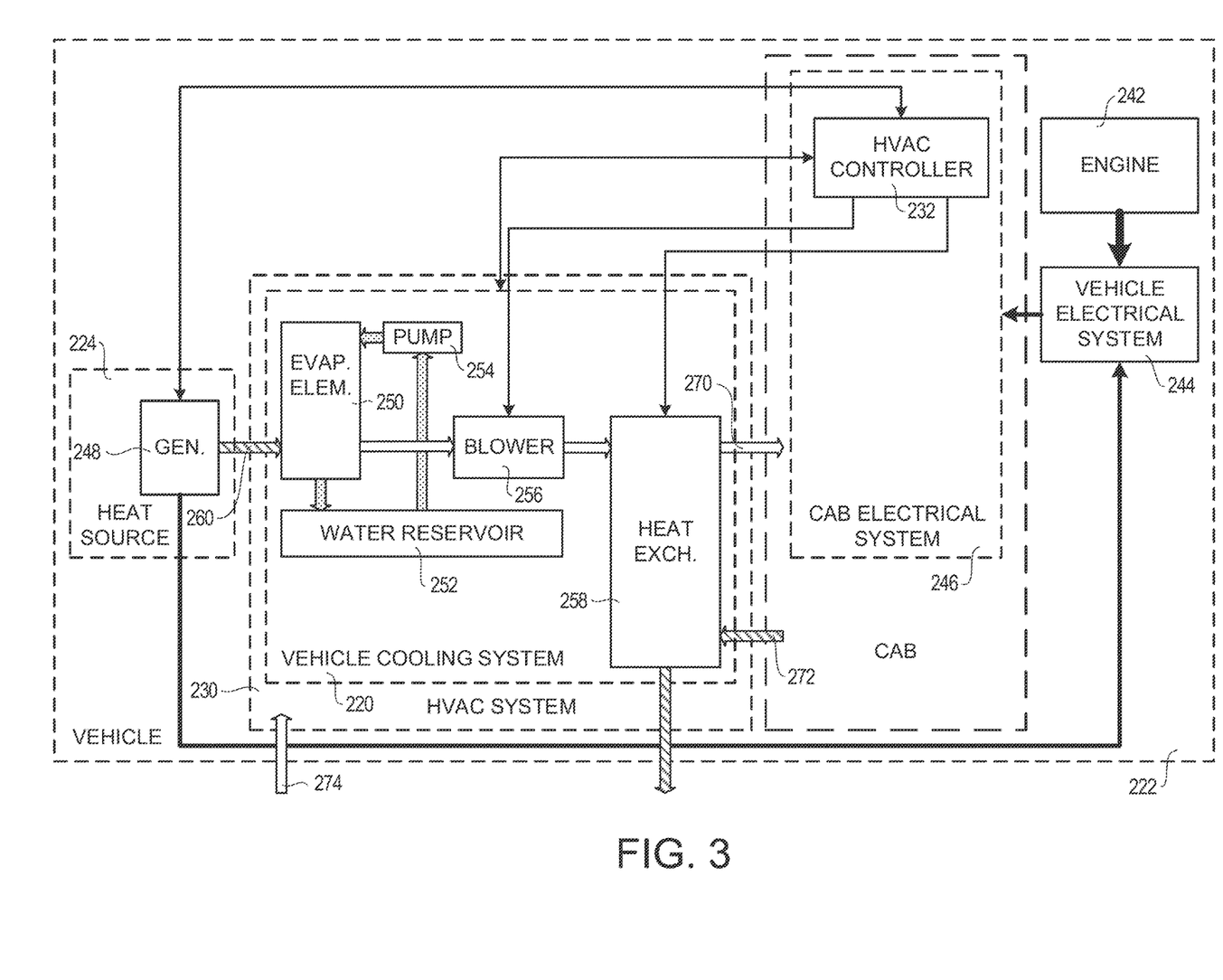
FIG. 3 is a block diagram of a vehicle employing a third example vehicle cooling system of the present invention.

Referring now to FIG. 3 of the drawing, depicted therein is a third example vehicle cooling system 220 of the present invention. The third example vehicle cooling system 220 is mounted on a vehicle 222 defining a vehicle heat source 224.

The third example vehicle cooling system 220 is an evaporative cooling system that cools air through the evaporation of water. Because the evaporation of water requires absorption of a relatively large amount of heat, the temperature of dry air can be lowered significantly during the phase transition of water from liquid water (liquid phase) to water vapor (vapor phase) during the evaporative cooling process. The first example vehicle cooling system 220 uses heated, dry air from the vehicle heat source 224 when operating in a cooling mode to form a source of cooled air.

The example vehicle cooling system 220 may be configured to form a part of a heating, ventilating, and air conditioning (HVAC) system 230 that is also capable of operating in a heating mode. The HVAC system 230 further comprises an HVAC control system 32 that determines whether the HVAC system 230 operates in the cooling mode or in the heating mode. The HVAC control system 232 may be a simple ON/OFF switch operated by an operator of the vehicle 222 to turn the first example vehicle cooling system 220 on or off as desired. Alternatively, the HVAC control system 232 may automatically operate the first example cooling system 220 to maintain a desired temperature. When the HVAC system 230 is further capable of operating in a heating and/or ventilating mode, the HVAC control system 232 may automatically operate the HVAC system 230 to operate in any of the cooling, heating, and/or ventilating modes as necessary for the comfort of the operator.

The example vehicle 222 will typically take the form a truck defining frame (not shown in FIG. 3) that supports a cab 240. The example heat source 224 is typically mounted on the frame outside of the cab 240. When the HVAC system 230 operates in the cooling mode, the vehicle cooling system 220 is controlled to supply cooled air to the interior of the cab 240 of the vehicle 222. When the HVAC system 230 operates in the optional heating mode, the HVAC system 230 supplies heated air to the interior of the cab 240 of the vehicle 222.

The example vehicle 222 further comprises an engine 242 and a vehicle electrical system 244 that supplies electrical power to a cab electronics system 246. Conventionally, the vehicle electrical system 244 generates electricity through one or more sources such as an alternator (not shown) driven by the engine 242, a battery (not shown), and/or ancillary power supplies such as a generator 248 for generating electrical power for use by the vehicle electrical system 244. The generator 248 forms the example heat source 224 as shown in FIG. 3.

FIG. 3 illustrates that the third example vehicle cooling system 220 comprises an evaporator element 250, a water reservoir 252, a pump 254, a blower 256, and a heat exchanger 258. The evaporator element 250 typically takes the form of a pad or other material that exposes air 260 from the generator 248 to water from the water reservoir 252. The pump 254 pumps water from the water reservoir 252 and onto the evaporator element 250. Water on the evaporator element 250 that is not evaporated by the heated air 260 collects back in the water reservoir 252 for reuse. The example HVAC system 230 further comprises supply and return air ducts 270 and 272 and an outside air inlet duct 274.

The air 260 from the generator 248 is hot and dry. After the air 260 passes over the evaporator element 250, the air is cooled by the evaporation process. The blower 256 forces the cooled air into the heat exchanger 258. The heat exchanger 258 draws cabin air from the cab 242 through the return duct 272 and forces cabin air back into the cab 242 through the supply duct 270. The heat exchanger further transfers heat from the cabin air to the cooled air from the blower 256. The heat exchanger 258 thus cools the cabin air as it circulates the cabin air through the cab 242.

FIG. 3 further illustrates that the HVAC controller 232 may be operatively connected to one or more of the generator 248, the pump 254, the blower 256, and the heat exchanger 258 to control operation of the third example vehicle cooling system 220 based on one or more settings determined by the operator of the vehicle 222.

IV. Example Generator System

Figure 4:
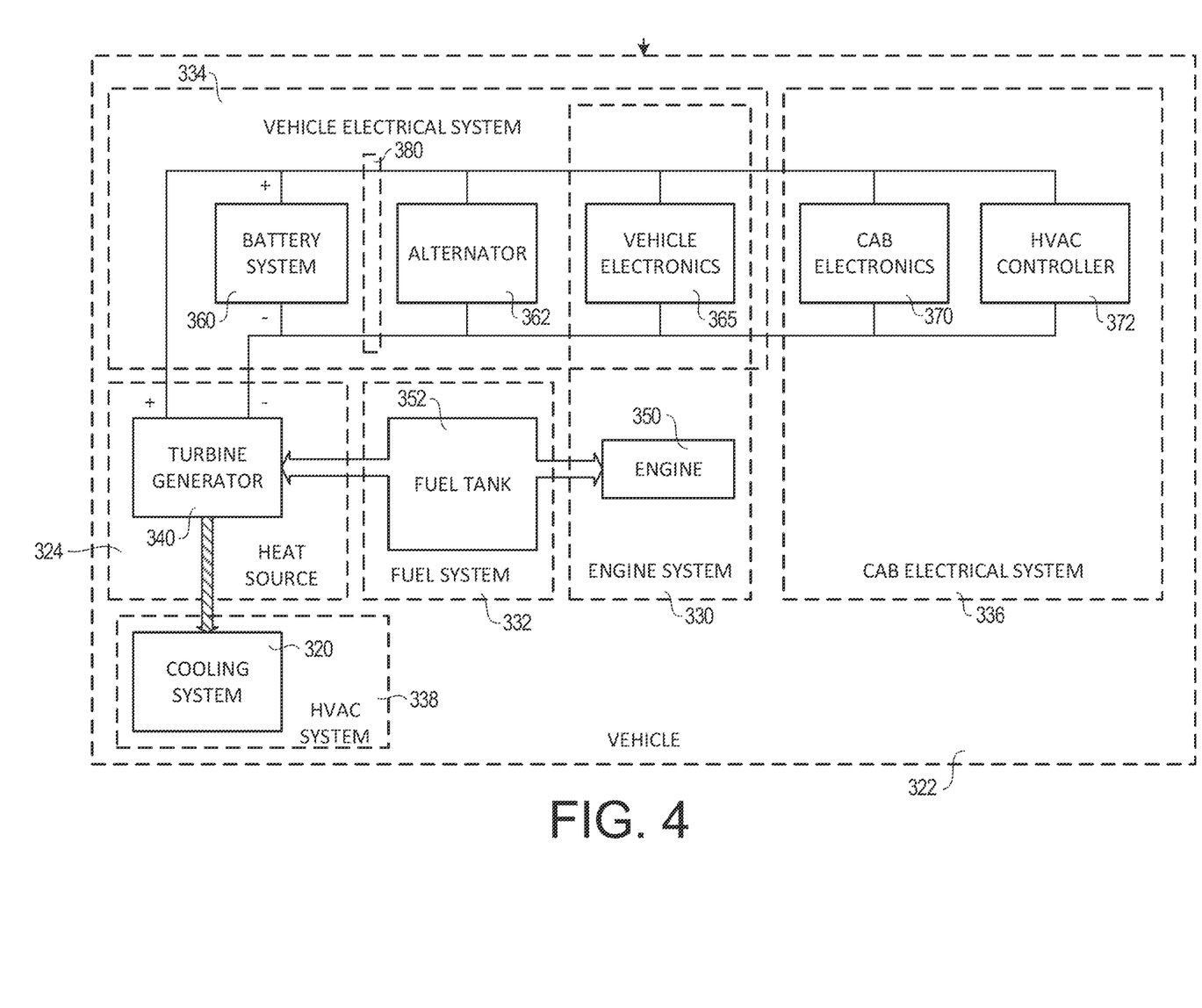
FIG. 4 is a block diagram of a vehicle depicting a turbine generator system as a heat source that may be used with any of the example vehicle cooling systems of the present invention.

Referring now to FIG. 4 of the drawing, depicted therein is a fourth example vehicle cooling system 320 of the present invention. The fourth example vehicle cooling system 320 is mounted on a vehicle 322 defining a vehicle heat source 324. The fourth example vehicle cooling system 320 is, like any of the example vehicle cooling systems 20, 120, and 220 described above, an evaporative cooling system that cools air through the evaporation of water. Any of the example vehicle cooling systems 20, 120, and 220 may be used as the fourth example cooling system 320, and the fourth example cooling system 320 will not be described again in detail herein.

FIG. 4 illustrates that the example vehicle 322 conventionally comprises an engine system 330, a fuel system 332, a vehicle electrical system 334, and a cab electrical system 336. The fourth example vehicle cooling system 320 may form part of an HVAC system 338. In the fourth example vehicle cooling system 320, the example vehicle heat source 324 is formed by a turbine generator 340. The example engine system 330 comprises an engine 350, and the example fuel system 332 comprises a fuel tank 352. The example fuel system 332 is configured to supply fuel to both the engine 350 and to the turbine generator 340. The vehicle electrical system 334 comprises a battery system 360, an alternator 362, and vehicle electronics 364. The vehicle electronics 364 further typically form a part of the engine system 330. The cab electrical system 336 comprises cab electronics 370 and an HVAC controller 372 operatively connected to the fourth example vehicle cooling system 220.

The example turbine generator 340 is operatively connected to a DC bus 380. In the example vehicle 322, the battery system 360, the alternator 362, the vehicle electronics 364, the cab electronics 370, and HVAC controller 372 are all operatively connected to obtain power from the DC bus 380. The example turbine generator 340 thus both supplies electrical power to the DC bus 380 for energizing the electrical components of the vehicle 322 and supplies dry heated air to the fourth example vehicle cooling system 320 to form a supply of cool air for operator comfort.

V. First Example Generator Heat Transfer System

Figure 5:
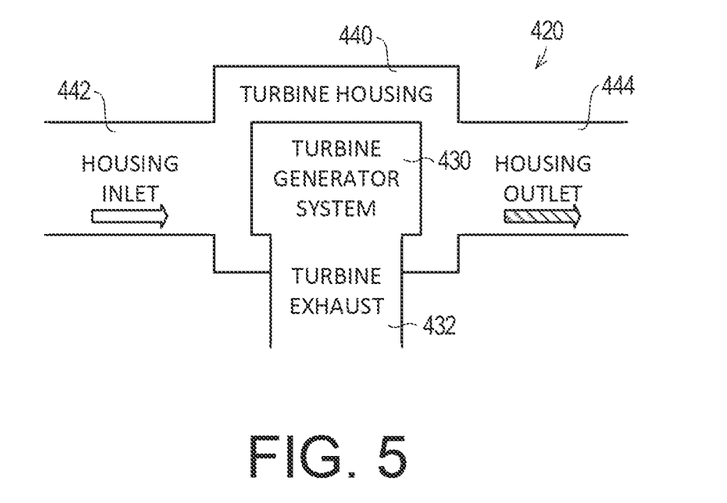
FIG. 5 is a first example generator heat transfer system for obtaining heated air from a turbine generator system functioning as a heat source for any of the example vehicle cooling systems of the present invention.

Referring now to FIG. 5 of the drawing, depicted therein is a first example generator heat transfer system 420 of the present invention. The first example generator heat transfer system comprises a turbine generator 430 defining a turbine exhaust duct 432 and a first turbine housing 440 defining a housing inlet 442 and a housing outlet 444. The example turbine exhaust duct 432 is configured to direct the flow exhaust gasses from the turbine generator 430 and out of the turbine housing 440. The example turbine housing 440 is configured to channel air along an air flow path from the housing inlet 442 to the housing outlet 444 such that air flowing along the air flow path flows over the turbine generator 430 such that heat is transferred from the turbine generator 430 to the air flowing along the air flow path but such that air flowing along the air flow path does not mix with the exhaust gasses flowing from the turbine generator 430. The example generator heat transfer system 420 is appropriate for use with the second example vehicle cooling system 120 described above.

VI. Second Example Generator Heat Transfer System

Figure 6:
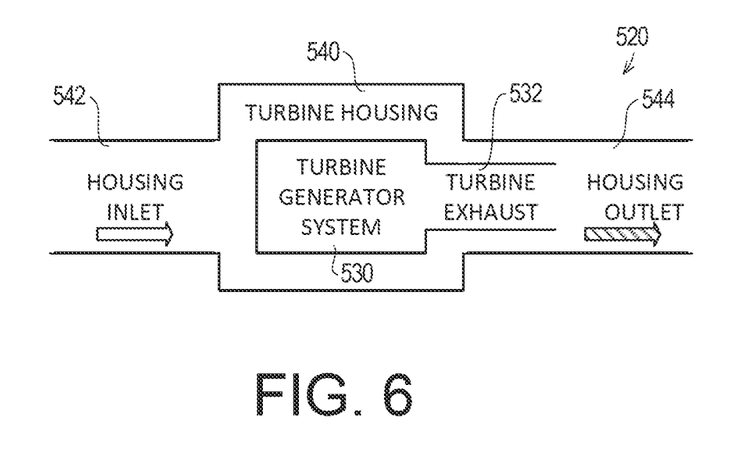
FIG. 6 is a second example generator heat transfer system for obtaining heated air from a turbine generator system functioning as a heat source for any of the example vehicle cooling systems of the present invention.

Referring now to FIG. 6 of the drawing, depicted therein is a second example generator heat transfer system 520 of the present invention. The second example generator heat transfer system comprises a turbine generator 530 defining a turbine exhaust duct 532 and a first turbine housing 540 defining a housing inlet 542 and a housing outlet 544. The example turbine exhaust duct 532 is configured to direct the flow exhaust gasses from the turbine generator 530. The example turbine housing 540 is configured to channel air along an air flow path from the housing inlet 542 to the housing outlet 544 such that air flowing along the air flow path flows over the turbine generator 530 such that heat is transferred from the turbine generator 530 to the air flowing along the air flow path. The example turbine exhaust duct 532 is arrange to such that air flowing along the air flow path mixes with the exhaust gasses flowing from the turbine generator 530. The example generator heat transfer system 520 is appropriate for use with the third example vehicle cooling system 220 described above.

What is claimed is:

1. A vehicle cooling system for a vehicle defining a cab comprising:
   a heat source supported by the vehicle;

an evaporative cooling system configured to evaporate water using heat from the heat source to form a supply of cool air for cooling the cab; and a heat exchanger; wherein cab air circulates through the heat exchanger and the cab; and the heat exchanger exchanges heat between the cab air and the supply of cool air from the evaporative cooling system.

2. A vehicle cooling system as recited in claim 1, further comprising:

a heat source housing defining a housing inlet and a housing outlet; wherein the heat source is at least partly arranged within the heat source housing; and air flows into the heat source housing through the housing inlet, around the heat source, and out of the housing outlet to transfer heat between the heat source and the evaporative cooling system.

3. A vehicle cooling system as recited in claim 1, in which the evaporative cooling system comprises:

an evaporator element;

a water reservoir; and a pump;

the pump forces water from the water reservoir to the evaporator element; and heat from the heat source is transferred to the evaporator element.

4. A vehicle cooling system as recited in claim 3, in which the evaporative cooling system further comprises:

a blower; wherein the blower forces the supply of cool air from the evaporator element to the cab.

5. A vehicle cooling system for a vehicle defining a cab comprising:

a generator supported by the vehicle;

an evaporative cooling system configured to evaporate water using heat from the generator to form a supply of cool air for cooling the cab; and a heat exchanger; wherein cab air circulates through the heat exchanger and the cab; and the heat exchanger exchanges heat between the cab air and the supply of cool air from the evaporative cooling system.

6. A vehicle cooling system as recited in claim 5, further comprising:

a generator housing defining a housing inlet and a housing outlet; wherein the generator is at least partly arranged within the generator housing; and air flows into the generator housing through the housing inlet, around the generator, and out of the housing outlet to transfer heat from the generator to the evaporative cooling system.

7. A vehicle cooling system as recited in claim 5, in which the evaporative cooling system comprises:

an evaporator element;

a water reservoir; and a pump;

the pump forces water from the water reservoir to the evaporator element; and heat from the generator is transferred to the evaporator element.

8. A vehicle cooling system as recited in claim 7, in which the evaporative cooling system further comprises:

a blower; wherein the blower forces the supply of cool air from the evaporator element to the cab.

9. A method of cooling a cab of a vehicle comprising the steps of:

supporting a heat source on the vehicle;

forming a supply of cool air for cooling the cab by evaporating water using heat from the heat source; and providing a heat exchanger;

circulating through cab air through the heat exchanger and the cab; and configuring the heat exchanger to exchange heat between the cab air and the supply of cool air from the evaporative cooling system.

10. A method as recited in claim 9, further comprising the steps of:

providing a heat source housing defining a housing inlet and a housing outlet;

at least partly arranging the heat source within the heat source housing; and transfer heat between the heat source and the evaporative cooling system by causing air to flow into the heat source housing through the housing inlet, around the heat source, and out of the housing outlet.

11. A method as recited in claim 9, further comprising the steps of:

providing an evaporator element;

providing a water reservoir;

forcing water from the water reservoir to the evaporator element; and transferring heat from the heat source to the evaporator element.

12. A method as recited in claim 11, further comprising the step of forcing the supply of cool air from the evaporator element to the cab.

* * * * *